Oct. 20, 1936.　　　N. KASDAN ET AL　　　2,057,720

LIPSTICK HOLDER

Filed April 24, 1935

INVENTORS
NATHAN KASDAN, AND
DANIEL POLLACK,
BY
ATTORNEY

Patented Oct. 20, 1936

2,057,720

UNITED STATES PATENT OFFICE 2,057,720

LIPSTICK HOLDER

Nathan Kasdan, New York, and Daniel Pollack, Brooklyn, N. Y., assignors to Majestic Metal Specialties, Inc., a corporation of New York Application April 24, 1935, Serial No. 17,912

3 Claims. (Cl. 206—56)

This invention relates to holders for lipstick material and the like and has for its object to provide a simple and inexpensive device of this class which is convenient to carry and manipulate.

Referring to the drawing.

Figure 1:
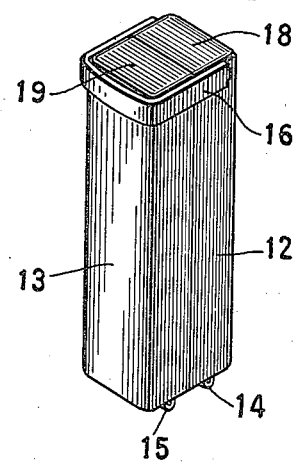
Fig. 1 is a perspective of one embodiment of this invention in closed position.
Figure 3:
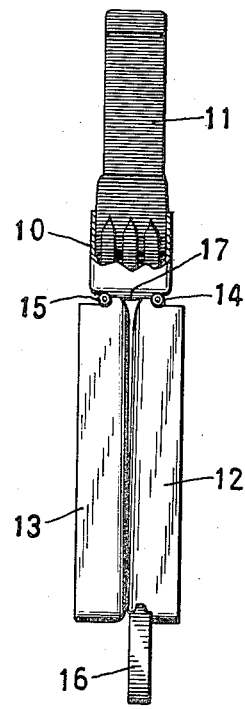
Fig. 3 is a front longitudinal view, partly in section of the device of Fig. 2.
Figure 2:
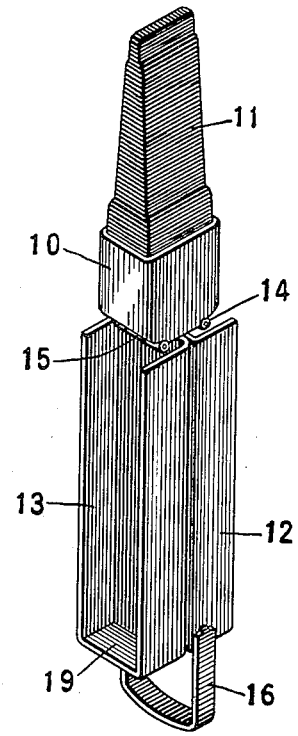
Fig. 2 is a perspective of the device of Fig. 1 in open position.

In the construction illustrated, in Figs. 1 to 3 inclusive, an inner casing 10 holds the stick of cosmetic material, such as rouge, lipstick, or the like, enclosed by an outer casing comprised of two portions 12 and 13, each separately hinged at 14 and 15 respectively, to the inner casing 10. Pivoted to the outer casing portion 12 near the top is a bail 16 shaped to the contour of the other casing portion 13 and adapted to be frictionally returned in place as shown in Fig. 1, whereby it holds the two casing portions 12 and 13 in closed position. From Fig. 3 it may be noted that the bottom 17 of the inner casing between the hinges is lower than it is elsewhere, so that when the portions 12 and 13 are folded back to form a handle portion, as illustrated in Figs. 2 and 3, the bottom of the portion 12 and 13 will substantially abut the bottom 17 of the inner casing 10. As shown in Fig. 3 the outer side portions of the outer casing members 12 and 13 also substantially abut so that the user may grasp the casing portions 12 and 13 as a handle in using the cosmetic stick. The tops 18 and 19 respectively, of the outer casing portions 12 and 13 constitute covers which close the inner casing and prevent the cosmetic stick from being contaminated by any dirt or foreign matter which might be in a woman's hand bag, in carrying. Fig. 2 quite clearly illustrates how the arms or main body portion of the outer casing parts 12 and 13 are each of substantially U, or similar shaped, cross-section.

Figure 4:
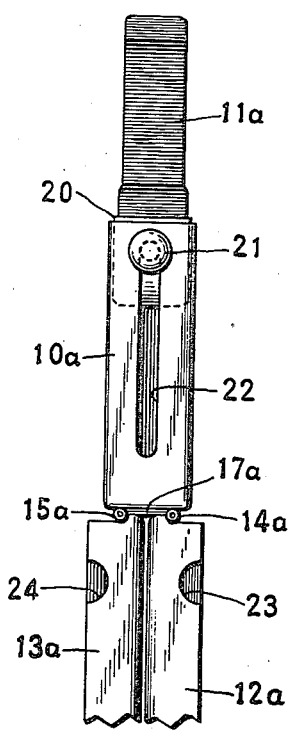
Fig. 4 is a front view of a modified embodiment of this invention in open position.
Figure 5:
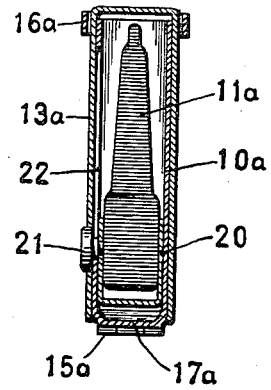
Fig. 5 is a section on the line 5—5 of Fig. 6.
Figure 6:
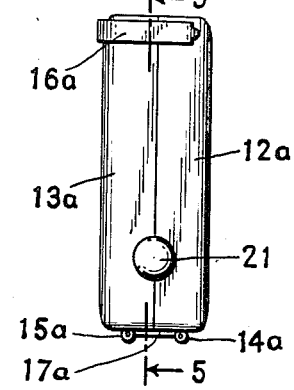
Fig. 6 is a front view of the device of Figs. 4 and 5 in closed position.

The device illustrated in Figs. 4 to 6 inclusive, is quite similar to that in Figs. 1 to 3, except that the inner casing 10a is elongated to receive a carrier 20 for the cosmetic stick 11a. An actuator 21 extends through a longitudinal slot 22 in the inner casing 10a so that when the outer casing parts 12a and 13a are open to form a handle the cosmetic stick may be ejected from the inner casing, on moving the actuator up the slot 22. In use, it will be found convenient to grasp the portions 12a and 13a as a handle by the palm and the fingers, enabling the actuator 21 to be moved by the thumb. The notches 23 and 24 cooperate with the actuator 21 when the carrier 20 is in retracted position in order to hold the cosmetic stick against sliding into contact with the covers 18a and 19a. The outer casing portions are hinged at 14a and 15a and a bail 16a holds them in closed position. The bottom of the inner casing 17a, between the hinges, extends down far enough to contact the bottoms of the outer casing portions when folded back in open position so that in both constructions illustrated in Figs. 1 to 3, and in Figs. 4 to 6 the inner casing and the cosmetic stick are held substantially rigidly and in alinement with the handle portion constituted by the outer casing parts when folded back. This is largely due to the bottom of the inner casing contacting with the bottoms of the outer casing portions when they are in open position.

Among the advantages of this invention may be mentioned the outer casing parts tightly enclose the inner casing and cosmetic stick against the ingress of any foreign matter when the device is not in use. The covers are held positively closed by the bail and this bail may be frictionally retained in the position shown in Figs. 1 and 6, for example, by its being shaped to the contour of the outer casing part around which it extends. If not so shaped as to be frictionally retained in position, it might be provided with small recesses or lugs for cooperation with a complementary part on one of the outer casing portions. Instead of being pivoted in the position indicated, this bail may also be pivoted more nearly in the transverse center of the outer casing portion 12 or 12a, so that when the outer casing portions are folded back to constitute a handle, the bail may also be frictionally retained around the other outer casing portion to hold these casing portions in open position, which is not possible in the embodiments illustrated.

We claim:

1. A holder for a cosmetic stick comprising an inner casing, an outer casing comprised of at least two portions each of which is hinged to the bottom of the inner casing in a manner to permit the two portions to be brought with their edges contiguous each other enclosing the inner casing and also to permit the two portions to be brought contiguous each other with their outer side faces substantially abutting below the inner casing, the bottoms of the two outer casing portions abutting the bottom of the inner casing when said portions are moved and their sides also abut below the inner casing.

2. A holder for a cosmetic material comprising an inner casing, an outer casing comprised of two portions each hinged to the bottom of the inner casing and adapted to enclose the inner casing on the sides and top and also to be folded back to act as a handle for said inner casing and material in applying the same, said portions each being hinged adjacent a corner of the inner casing and the bottom of said inner casing between said hinges extending lower than on the other side of either hinge.

3. A holder for a cosmetic material comprising an inner casing, an outer casing comprised of two portions each hinged to the bottom of the inner casing and adapted to enclose the inner casing on the sides and top and also to be folded back to act as a handle for said inner casing and material in applying the same, said portions each being hinged adjacent a corner of the inner casing and the bottom of said inner casing between said hinges extending lower than on the other side of either hinge, said inner casing having a carrier therein and a longitudinal slot, an actuator projecting from said carrier out of the longitudinal slot in the under casing, said actuator also projecting out of the outer casing when closed, the outer casing being shaped to retain said actuator and carrier in their retracted position.

NATHAN KASDAN.
DANIEL POLLACK.